United States Patent Office 3,689,453
Patented Sept. 5, 1972

---

3,689,453
DIALLYL PHTHALATE MOLDING COMPOSITIONS
Nicholas Richard Segro, Baltimore, Md., assignor to FMC Corporation, New York, N.Y.
No Drawing. Filed Dec. 22, 1970, Ser. No. 100,842
Int. Cl. C08f 45/10
U.S. Cl. 260—41 AG     4 Claims

ABSTRACT OF THE DISCLOSURE

Molding compositions comprising diallyl orthophthalate prepolymer and, where desired for flame retardancy, a chlorine containing monomer such as diallyl chlorendate, fillers, mold release agents, and a catalyst to promote the heat advancing or thermosetting thereof, and about 2–10% by weight of an epoxy compound, based on the weight of the prepolymer plus monomer, to stabilize articles molded from the molding compositions against development of crystalline sublimate when the molded articles are exposed to high temperatures.

BACKGROUND OF THE INVENTION (A) Field of the invention

This invention relates to diallyl phthalate compositions which can be molded into articles that are stabilized against crystalline sublimate formation when exposed to elevated temperatures.

(B) Description of the prior art

Diallyl phthalate resins have been used for many years in the preparation of electrical moldings. They have the unique property of retaining their electrical properties when wet and therefore are used in electrical applications where moisture is apt to be present. The prepolymer is compounded with fillers, lubricants, catalysts to insure crosslinking during the molding, and other incidental ingredients, where desired, to produce the final molding composition.

One difficulty that has occurred in molded articles made from diallyl phthalate prepolymers is that, when subjected to elevated temperatures for extended periods of time, the molded articles produce very small quantities of crystalline sublimates which interfere with the operation of electrical equipment, particularly electronic microswitches and the like.

Sublimation is intensified when the diallyl phthalate molding compositions are modified with chlorine-containing materials to enhance the flame retardancy of the molding compounds. Flame retardance is generally imparted to diallyl phthalate molding compositions by the use of a diallyl ester of a chlorinated polybasic acid, together with antimony oxide. The common chlorinated esters are the diallyl esters of chlorendic anhydride, the Diels-Alder condensate of hexachlorocyclopentadiene and maleic anhydride, which is chemically 1,4,5,6,7-hexachlorobicyclo-(2.2.1)-5-heptene-2,3-dicarboxylic acid; and a similar esters of the Diels-Alder condensate of hexachlorocyclopentadiene and tetrahydrophthalic anhydride, which is chemically 1,2,3,4,9,9-hexachloro - 1,4,4a,5,6,7,8a-octahydro-1,4 - methanonaphthalene - 6,7 - dicarboxylic anhydride. For some reason, the use of these addants tends to aggravate sublimation from flame retarded moldings.

The primary market for diallyl phthalate molding compositions is represented by the various military markets, and in fact, the electrical and physical property requirements of the military specifications set the standards for the industry.

Diallyl phthalate molding compositions that do not produce crystalline sublimate as measured in the thermal stability test, which have low ionic impurities as measured by the water extract conductivity test and which have adequate electrical properties, are desired.

SUMMARY OF THE INVENTION

I have now discovered filled diallyl phthalate molding compositions which can be molded into articles that meet the military specification standards and which do not produce crystalline sublimate when subjected to elevated temperatures, as in a thermal endurance test. These new compositions are made by incorporating in molding composition from about 2 to about 10% by weight, based on the weight of diallyl phthalate prepolymer, of an epoxy compound having an epoxide equivalent of 75 to 550. Useful epoxy compounds include those with more than one epoxy groups which may be situated internally, terminally or on cyclic structures and those containing at least one epoxy group and olefinic unsaturation. These epoxy compounds or epoxy resins are also effective in controlling sublimation where chlorine-containing monomers have been incorporated in a molding composition to make flame retardant compositions. A typical chlorine-containing monomer is diallyl chlorendate. The small amounts of epoxy compounds incorporated in the molding compositions control sublimation and do not adversely affect the physical and electrical properties of articles molded from these compositions. These compositions will pass the new thermal endurance "cold plate" oven test.

DESCRIPTION OF THE INVENTION AND THE PREFERRED EMBODIMENTS

The filled diallyl phthalate molding compounds of this invention are typical diallyl phthalate molding compounds, generally containing at least 30% by weight diallyl phthalate prepolymer, and preferably more than 40% by weight diallyl phthalate prepolymer. These molding compounds can contain up to about 200 parts by weight of filler per hundred parts of polymerizable material, and commonly contain between 100 and 200 parts of filler per 100 parts of polymerizable material. Diallyl phthalate molding compounds generally contain about 1 to about 5% by weight of a free radical catalyst based on the weight of the polymerizable materials. These molding compositions commonly contain minor amounts of other materials commonly used in preparing allylic molding compositions such as: pigments; mold release agents, such as calcium stearate, lauric acid, and the like; and, glass coupling agents such as vinyl tris (2-methoxyethoxy) silane and gamma methacryloxypropyltrimethoxy silane, which assure proper wetting of the fillers.

Diallyl orthophthalate prepolymers useful in practicing this invention may be manufactured by polymerizing the monomeric material to produce a soluble solution of prepolymer and monomer. Polymerization is carried to a point short of gelation. The prepolymer is then separated from the unpolymerized monomer. This may be done by treatment with a solvent which dissolves the monomer and precipitates the prepolymer. Such a general process is described by Heiberger in U.S. Pat. 3,096,310. Prepolymers may also be separated from unpolymerized monomer by distillation as disclosed by Mednick et al. in U.S. Pat. 3,285,836, issued May 28, 1968. The diallyl phthalate prepolymers are solids containing little or no monomer; they can be stored indefinitely in this form since they require catalysts and either heat, actinic light or nuclear particle radiation to convert them to the insoluble or thermoset stage.

Epoxy compounds useful in practicing this invention are polyepoxides of the glycidyl ether type, cycloaliphatic polyepoxides and epoxides containing double bond functionality having epoxide equivalents of up to 550 and preferably 75 to 550 and most preferably 75 to 250. The lower the epoxy equivalent the lower the amount of epoxy required; only 5% epoxy is required if its epoxy equivalent is 250 or less. I have successfully used glycidyl methacrylate (epoxide equivalent—142), diglycidyl ether of bisphenol, a resin (epoxide equivalent of 185 to 192, Epon 828 from Shell Chemical Company), polyglycidyl ether of tetraphenylene ethane (Epon 1031 from Shell Chemical Company, epoxide equivalent of 210 to 240), polyglycidyl ether of phenolic novolak (ERR–0100 from Union Carbide Corporation, epoxide equivalent of 190 to 200), and 3,4 - epoxycyclohexylmethyl - 3,4-epoxycyclohexane carboxylate (ERL–4221 from Union Carbide Corporation, epoxide equivalent of 133) and epoxy resins based on tetrabromo-bisphenol A (DER #542 Dow Chemical Co., epoxide equivalent 350–400). I have found no epoxy compounds which meet these conditions that cannot be used in practicing this invention.

Flame retardance is generally imparted to these molding compositions by the use of a chlorinated monomer, generally a diallyl ester of a chlorinated polybasic acid. The preferred chlorinated esters are the diallyl esters of chlorendic anhydride, a Diels-Alder condensate of hexachlorocyclopentadiene in maleic anhydride which is chemically 1,4,5,6,7,7-hexachlorobicyclo (2.2.1)-5-heptene-2,3-dicarboxylic acid; and a similar ester of the Diels-Alder condensate of hexachlorocyclopentadiene and tetrahydrophthalic anhydride, which is chemically 1,2,3,4,9,9-hexachloro - 1,4,4a,5,6,7,8,8a-octahydro-1,4-methanonaphthalene-6,7-dicarboxylic anhydride.

The molding compositions of this invention are made by blending together the diallyl phthalate prepolymer and monomer, epoxy resin, catalyst and minor amounts of other miscellaneous addants with filler, which may be a reinforcing filler, such as inert fibers or non-reinforcing filler, such as fine particle size, inert inorganic materials. The materials are compounded in any known manner conventionally used in compounding diallyl phthalate molding compounds. The principal difference between the compositions of this invention and those diallyl phathalate molding compositions commercially used is the presence of a small amount of an epoxy compound or an epoxy resin described above.

A conventional free radical catalyst for the system is necessary to insure curing of the molding or laminating composition. Any free radical generating catalyst which remains active at the molding temperature may be employed. However, peroxide catalysts are preferred. Since molding temperatures of the order of 120–150° C. are conventional, the most preferred catalyst, from cost considerations, are tert-butyl perbenzoate and dicumyl peroxide. In general, from about 1 to 5% catalyst based on polymerizable materials is employed, although the required effective amount obviously depends on both the formulation of the composition and the particular catalyst used, and with any particular composition and catalyst, may be more or less than indicated.

Inert fillers which can be used in practicing this invention can include: chalk, limestone, calcium sulfate (anhydrous) calcium silicate (wollastonite), calcium carbonate, silica, barium sulfate, asbestos, glass (powdered), quartz, aluminum trihydrate, aluminum oxide, antimony oxide, inert iron oxides, and ground stone such as granite, basalt, marble, limestone, sandstone, phosphate rock, travertine, onyx and bauxite. Inert fibrous fillers, such as chopped fiber glass, chopped polyester fibers and the like, added to reinforce diallyl phthalate molding compounds are also useful in the molding compounds of this invention.

The following examples, illustrating the novel compositions disclosed herein, are given without any intention that the invention be limited thereto. All parts and percentages are by weight, unless otherwise noted.

EXAMPLE 1

Granular type molding compositions

A series of molding compounds containing diallyl orthophthalate prepolymer, chopped glass fibers, peroxide catalysts, calcium stearate (mold release), in some cases a silane coupling agent, and an epoxy compound were prepared by mixing in a heavy duty dough type mixer with sufficient acetone to flux the materials into a mass. The acetone was evaporated from the mixed ingredients and the dried compounds were compounded for 135 seconds on a differential speed two-roll mill that had chromium plated 12″ wide by 6″ diameter rolls which were set at a gap of 0.050 inch (50 mils). The fast roll turned at 26 r.p.m. and was heated to a temperature of 200° F. and the slow roll, which turned at 20 r.p.m., was heated to a temperature of 180° F. The resin in the compounds first fused the compounds into a non-homogeneous mass clinging to both mill rolls. The mass soon transferred and clung entirely to the faster and warmer roll, where, as a result of the shearing action of the two-speed rolls, the composition became a uniform band or sheet on this roll. Each sheet was removed from the mill, cooled and then ground in a grinder (a Wiley mill) to yield dry granular molding powders. Quantities of the resulting granular molding compounds were molded at a temperature of 150° C. under a pressure of 3000 p.s.i. for 5 minutes to produce insoluble, infusible two inch diameter by ⅛ inch thick discs. These discs were quartered and used for testing in the thermal endurance test.

The thermal endurance tests for sublimation were run as follows:

Test tubes were mounted in a conventional convection oven, with the lips of the test tubes extending into the atmosphere. One-quarter sections of one-eighth inch thick by two inch diameter molded discs were placed in the test tubes, and the test tubes were covered with clean glass plates. Normally the pieces of molded discs were weighed initially and after 96 hours exposure in the test tube with an oven temperature at 155° C. With the glass plate covers being in the outside atmosphere, any sublimate formed condensed on the cold plate and was easily observed. Usually crystals developed in the first few hours if the tendency was to do so. If no crystals appeared in the first few hours, generally none appeared after 96 hours or longer. The apparatus used in conducting the sublimation test was a gravity oven modified with a number of one inch diameter openings in its top to allow for the insertion of eight 25 mm. by 200 mm. Pyrex test tubes. The oven was of such size as to give 290 cubic inches of open oven volume per test tube. The test tubes were supported so that they projected 3½ inches into the oven. During the test each of the test tubes was covered with a 2″ by 2″ by ¼″ plate glass square.

The compositions of the examples, the results of sublimation and weight loss tests and comparison examples are set forth in Table I. Physical and electrical properties of molded samples of Runs 4 and 6 in Comparison Run B are set forth in Table 3.

TABLE I.—GRANULAR MOLDING COMPOUNDS

|  | Run number |  |  |  |  |  |  |  |  | Comparison runs |  |
|---|---|---|---|---|---|---|---|---|---|---|---|
|  | 1 | 2 | 3 | 4 | 5 | 6 | 7 | 8 | 9 | a | b |
| Diallyl orthophthalate prepolymer | 855 | 873 | 873 | 855 | 855 | 855 | 810 | 855 | 855 | 900 | 900 |
| Chopped glass fibers ¼″ | 900 | 900 | 900 | 900 | 900 | 900 | 900 | 900 | 900 | 900 | 900 |
| t-Butyl perbenzoate | 27 | 27 | 27 | 27 | 27 | 27 | 27 | 27 | 27 | 27 | 27 |
| Calcium stearate | 18 | 18 | 18 | 18 | 18 | 18 | 18 | 18 | 18 | 18 | 18 |
| Acetone | 900 | 900 | 900 | 900 | 900 | 900 | 900 | 900 | 900 | 900 | 900 |
| Vinyl-tris(2 methoxyethoxy)silane |  |  | 9 |  |  | 9 |  | 9 | 9 |  | 9 |
| Glycidyl methacrylate | 45 |  |  |  |  |  |  |  |  |  |  |
| Diglycidyl ether of bisphenol A resin (Epon 828), epoxide equiv. 185–192 |  | 27 | 27 | 45 |  |  |  |  |  |  |  |
| Polyglycidyl ether of tetraphenylene ethane (Epon 1031), epoxide equivalent 210–240 |  |  |  |  | 45 | 45 | 90 |  |  |  |  |
| Polyglycidyl ether of phenolic Novolak resin (ERR-0100), epoxide equivalent 190–220 |  |  |  |  |  |  |  | 45 |  |  |  |
| 3,4-epoxycyclohexylmethyl-3,4-epoxycyclohexane carboxylate (ERL 4221), epoxide equiv. 133 |  |  |  |  |  |  |  |  | 45 |  |  |
| Sublimation test (96 hours, oven at 155° C.): |  |  |  |  |  |  |  |  |  |  |  |
| Sublimed |  |  |  |  |  |  |  |  |  | X | X |
| No sublimation | X | X | X | X | X | X | X | X | X |  |  |
| Weight loss, percent | 0.51 | 0.55 | 0.51 | 0.47 | 0.52 | 0.47 | 0.29 | 0.43 | 0.50 | 0.78 | 0.59 |

TABLE III

|  | Comparison Run B | Run Number |  |  |
|---|---|---|---|---|
|  |  | 4 | 6 | 13 |
| Specific gravity | 1.678 | 1.678 | 1.678 | 1.75 |
| Heat distortion temperature, °C | 236 | 186 | 242 | 254 |
| Izod impact, ft. lbs./inch notch | 0.94 | 0.81 | 0.79 | 1.09 |
| Flexural strength, p.s.i. | 18,640 | 14,576 | 12,788 | 15,667 |
| Flexural modulus, p.s.i. | 1.66×10⁶ | 1.56×10⁶ | 1.44×10⁶ | 1.57×10⁶ |
| Compressive strength, p.s.i. | 24,983 | 24,385 | 23,792 | 23,190 |
| Rockwell hardness | 115 M, 91 E | 111 M, 84 E | 113 M, 88 E | 113 M, 91 E |
| Water absorption, percent (48 hrs. at 50° C.) | 0.18 | 0.16 | 0.17 | 0.14 |
| Mold shrinkage, in./in | 0.004 | 0.005 | 0.005 | 0.005 |
| Volume resistivity, ohms-cm | 7.63×10¹⁵ | 2.24×10¹⁵ | 1.88×10¹⁶ | 6.056×10¹⁵ |
| Surface resistivity, ohms | 8.79×10¹⁵ | 7.66×10¹⁵ | 4.02×10¹⁵ | 1.149×10¹⁶ |
| Water extract conductivity (megohm⁻¹ cm.⁻¹) [a]: |  |  |  |  |
| 6 days | 52.4 | 27.4 | 41.6 | 24.7 |
| 12 days |  | 33.7 | 46.6 | 26.9 |
| Dielectric constant 10³/10⁶ | 4.39/4.23 | 4.34/4.21 | 4.45/4.32 | 4.30/4.25 |
| 24 hrs. H₂O | 4.43/4.27 | 4.39/4.25 | 4.50/4.35 | 4.35/4.29 |
| Dissipation factor, 10³/10⁶ | .007/.007 | .006/.006 | .006/.007 | .006/.007 |
| 24 hrs. /H₂O | .007/.008 | .006/.007 | .006/.008 | .005/.007 |

[a] Per Mil-P-1083 B.

TABLE II.—FLAME RESISTANT, SHORT GLASS MOLDING COMPOUNDS

|  | 11 | 12 | 13 | Comparison example |
|---|---|---|---|---|
| Diallyl orthopthalate prepolymer | 720 | 720 | 810 | 765 |
| Diallyl chlorendate monomer | 135 | 135 |  | 135 |
| Chopped glass fibers, ¼″ | 765 | 765 | 765 | 765 |
| Antimony oxide | 135 | 135 | 135 | 135 |
| t-Butyl perbenzoate | 27 | 27 | 27 | 27 |
| Calcium stearate | 18 | 18 | 18 | 18 |
| Vinyl-tris (2 methoxyethoxy) silane | 9 | 9 | 9 | 9 |
| Acetone | 900 | 900 | 900 | 900 |
| Diglycidyl ether of bisphenol A resin (Epon 828) | 45 |  |  |  |
| Polyglycidol ether of phenolic Novolak resin (ERR-0100) |  | 45 |  |  |
| Brominated epoxy resin [1] |  |  | 90 |  |
| Sublimation test: |  |  |  |  |
| Sublime |  |  |  | X |
| No Sublimation | X | X | X |  |
| Weight loss, percent | 0.40 | 0.43 | 0.41 | 0.58 |

[1] Dow Der #542, epoxide equivalent=350–400 (an epoxy resin based on tetrabromo-bisphenol A).

EXAMPLE 2

Fire-resistant diallyl orthophthalate compositions were prepared according to Example 1 and tested as described in Example 1. The principal formulation difference was that the fire-resistant materials included diallyl chlorendate monomer and antimony oxide, and a silane coupling agent was used in all runs. The molding composition details and sublimation test results are set forth in Table 2. Run No. 13 in Table 2 contained a brominated epoxy resin and no diallyl chlorendate. Additional molded properties of the composition of Run No. 13 are found in Table 3. Samples for testing were molded for 5 minutes at 300° F. and 3000 p.s.i.

The principle of this invention has been explained and exemplified in a manner so that it can be readily practiced by those skilled in the art. The best mode contemplated by the inventor has been set forth. Clearly, within the scope of the appended claims, the invention may be practiced by those skilled in the art having the benefit of this disclosure, otherwise, than as specifically described and exemplified herein.

What is claimed is:

1. A filled diallyl orthophthalate molding composition consisting essentially of at least 30% by weight of thermosetting diallyl orthophthalate prepolymer, an amount of a peroxide catalyst effective to promote thermosetting at elevated temperatures, and 2 to 10% by weight, based on the diallyl phthalate prepolymer, of an epoxy compound having an epoxide equivalent 75 to 550 selected from the group consisting of (1) epoxy compounds having more than one epoxy group, which may be situated internally, terminally or on cyclic structures and (2) epoxy compounds having at least one epoxy group and olefinic unsaturation.

2. The compound of claim 1 in which the epoxy compound has an epoxide equivalent of 75 to 250.

3. The compound of claim 1 in which there is 100 to 200 parts by weight of inert filler for each 100 parts by weight of prepolymer.

4. The compound of claim 1 in which the filler is chopped fiber glass.

References Cited
FOREIGN PATENTS 1,564,365  4/1969  France _____ 260—837

LEWIS T. JACOBS, Primary Examiner

U.S. Cl. X.R.

260—37 EP